(12) United States Patent
Guenot-Falque et al.

(10) Patent No.: US 10,771,983 B2
(45) Date of Patent: Sep. 8, 2020

(54) SYSTEM AND METHOD FOR OPTIMIZING PLACEMENT AND NUMBER OF RADIO-FREQUENCY BEACONS TO ACHIEVE BETTER INDOOR LOCALIZATION

(71) Applicant: FUJI XEROX CO., LTD., Tokyo (JP)

(72) Inventors: Raphael Guenot-Falque, Sydney (AU); Miteshkumar Patel, San Jose, CA (US); Jacob Biehl, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/942,543

(22) Filed: Apr. 1, 2018

(65) Prior Publication Data
US 2019/0306724 A1   Oct. 3, 2019

(51) Int. Cl.
*H04W 16/20* (2009.01)
*H04W 4/80* (2018.01)
(Continued)

(52) U.S. Cl.
CPC .......... *H04W 16/20* (2013.01); *H04W 4/02* (2013.01); *H04W 4/80* (2018.02); *H04W 48/12* (2013.01)

(58) Field of Classification Search
CPC ......... H04W 4/00; H04W 4/06; H04W 4/185; H04W 4/20; H04W 4/203; H04W 4/30; H04W 4/33; H04W 4/50–80
See application file for complete search history.

(56) References Cited

U.S. PATENT DOCUMENTS

2005/0136845 A1* 6/2005 Masuoka .............. G01S 5/0294
                                                    455/67.14
2012/0182933 A1* 7/2012 Bandhakavi .......... G01S 5/0242
                                                    370/328
(Continued)

OTHER PUBLICATIONS

Paterna et al. "A Bluetooth Low Energy Indoor Positioning System with Channel Diversity, Weighted Trilateration and Kalman Filtering", Sensors, MDPI, published on Dec. 16, 2017. (Year: 2017).*
(Continued)

*Primary Examiner* — San Htun
(74) *Attorney, Agent, or Firm* — Procopio, Cory, Hargreaves & Savitch LLP

(57) ABSTRACT

A novel solution to generate an optimal spatial placement map of Radio Frequency (RF) beacons, such as Bluetooth Low Energy (BLE) beacons, which can be used for indoor localization. A described embodiment solves for both generating optimal number of beacons required in a given environment and optimizing their location. The solution also incorporates behavior of RF signal due to various environmental factors such as signal reflection and absorption due to static and dynamic obstacles. In one embodiment, the framework is built upon Genetic Algorithm (GA) for optimization of beacon placement. The experimental results achieved using one implementation of the described method reduced the number of beacons by 50% as compared to beacons placed using expert knowledge. Furthermore, the overall localization error increased by ~0.4 m when the results using the RF/BLE map generated by the described system were compared with the RF/BLE map generated using expert knowledge.

18 Claims, 3 Drawing Sheets

(51) Int. Cl.
*H04W 4/02* (2018.01)
*H04W 48/12* (2009.01)

(56) References Cited

U.S. PATENT DOCUMENTS

| | | | | |
|---|---|---|---|---|
| 2013/0342401 | A1* | 12/2013 | Lin ........................ | G01S 5/0252 342/451 |
| 2014/0011518 | A1* | 1/2014 | Valaee .................. | H04W 64/00 455/456.1 |
| 2018/0067187 | A1* | 3/2018 | Oh ........................ | H04W 64/00 |
| 2018/0098301 | A1* | 4/2018 | Sun ....................... | H04W 64/00 |

OTHER PUBLICATIONS

Y. Gu, A. Lo, and I. Niemegeers, "A survey of indoor positioning systems for wireless personal networks," IEEE Commun. Surv. Tutor., vol. 11, No. 1, pp. 13-32, First 2009.

M. G. Jadidi, M. Patel, and J. V. Miro, "Gaussian processes online observation classification for RSSI-based low-cost Indoor positioning systems," in Robotics and Automation (ICRA), 2017 IEEE International Conference on, 2017, pp. 6269-6275.

R. Faragher and R. Harle, "Location Fingerprinting With Bluetooth Low Energy Beacons," IEEE J. Sel. Areas Commun., vol. 33, No. 11, pp. 2418-2428, Nov. 2015.

N. Amiot, M. Laaraiedh, and B. Uguen, "PyLayers☐: An Open Source Dynamic Simulator for Indoor Propagation and Localization," Commun. Workshop ICC, 2013.

M. Hefeeda and H. Ahmadi, "A Probabilistic Coverage Protocol for Wireless Sensor Networks," in 2007 IEEE International Conference on Network Protocols, 2007, pp. 41-50.

Y. Yoon and Y. H. Kim, "An Efficient Genetic Algorithm for Maximum Coverage Deployment in Wireless Sensor Networks," IEEE Trans. Cybern., vol. 43, No. 5, pp. 1473-1483, Oct. 2013.

J.-H. Seo, Y. Yoon, and Y.-H. Kim, "An Efficient Large-Scale Sensor Deployment Using a Parallel Genetic Algorithm Based on CUDA," Int J Distrib Sen Netw, vol. 2016, p. 24-, Mar. 2016.

Y. Chen, J. a Francisco, W. Trappe, and R. P. Martin, "A Practical Approach to Landmark Deployment for Indoor Localization," in 2006 3rd Annual IEEE Communications Society on Sensor and Ad Hoc Communications and Networks, 2006, vol. 1, pp. 365-373.

Y. Zou and K. Chakrabarty, "Sensor deployment and target localization based on virtual forces," in IEEE INFOCOM 2003. Twenty-second Annual Joint Conference of the IEEE Computer and Communications Societies (IEEE) Cat. No.03CH37428), 2003, vol. 2, pp. 1293-1303 vol. 2.

* cited by examiner

SYSTEM AND METHOD FOR OPTIMIZING PLACEMENT AND NUMBER OF RADIO-FREQUENCY BEACONS TO ACHIEVE BETTER INDOOR LOCALIZATION

BACKGROUND OF THE INVENTION

Technical Field

The disclosed embodiments relate in general to localization and tracking systems and methods and, more specifically, to system and method for optimizing placement and number of Radio Frequency (RF) beacons, such as Bluetooth Low Energy (BLE) beacons, to achieve better indoor localization.

Description of the Related Art

Wireless communication technologies being widespread and ubiquitous have been studied extensively as a solution to indoor positioning systems described in Y. Gu, A. Lo, and I. Niemegeers, "A survey of indoor positioning systems for wireless personal networks," IEEE Commun. Surv. Tutor., vol. 11, no. 1, pp. 13-32, First 2009. Various solutions using Bluetooth Low Energy (BLE) including M. G. Jadidi, M. Patel, and J. V. Miro, "Gaussian processes online observation classification for RSSI-based low-cost indoor positioning systems," in *Robotics and Automation (ICRA)*, 2017 *IEEE International Conference on*, 2017, pp. 6269-6275 and R. Faragher and R. Harle, "Location Fingerprinting With Bluetooth Low Energy Beacons," IEEE J. Sel. Areas Commun., vol. 33, no. 11, pp. 2418-2428, November 2015, have been proposed which uses Received Signal Strength Indication (RSSI) available from BLE beacons installed in a given environment. In indoor environments, the radio signals are severely impacted due to shadowing and multi-pathing effects, which make the data noisier. In order to receive better RSSI signal from BLEs, they are placed in locations where RSSI signals are available through Line-Of-Sight (LOS) thereby going through minimal multi-pathing. Scaling BLE based indoor positioning becomes a challenging problem as it involves placing beacons at the optimal location to get a high level of localization accuracy. In most of the indoor positioning systems described above, beacons are manually placed using expert knowledge who understands signal behavior due to various environmental conditions. Hence placing BLE beacons optimally has been explored by research experts in sensors networks and robotics community. The optimal BLE map is a function of different parameters such as the number of beacons, the signal broadcast frequency, transmission power, indoor environment, and the required localization accuracy.

Therefore, in view of the aforesaid limitations of the conventional technology, new and improved systems and methods are needed for optimizing placement and number of RF/BLE beacons to achieve better indoor localization.

SUMMARY OF THE INVENTION

The embodiments described herein are directed to methods and systems that substantially obviate one or more of the above and other problems associated with conventional localization and tracking systems.

In accordance with one aspect of the inventive concepts described herein, there is provided a computer-implemented method, the method being performed in a computerized system comprising a central processing unit, a localization signal receiver and a memory, the computer-implemented method comprising: determining an optimal number of beacons in a plurality of beacons to be placed in an environment to achieve an optional localization; and determining an optimal placement of the beacons from the plurality of beacons in the environment to achieve the optional localization.

In one or more embodiments, the beacons are Radio Frequency (RF) beacons.

In one or more embodiments, the beacons are Bluetooth low energy (BLE) beacons.

In one or more embodiments, the localization signal receiver is a radiofrequency receiver and wherein the localization signal sources are radiofrequency sources.

In one or more embodiments, determining an optimal number of beacons comprises starting with an empty set of beacons and iteratively adding one beacon at a time until a predefined termination criterion has been met.

In one or more embodiments, the optimal number of beacons is determined based on a cost function, which combines a beacon coverage requirement and a beacon spread requirement to determine the optimal number of beacons.

In one or more embodiments, the beacon coverage requirement is set to three such that scans from at least three beacons of the plurality of beacons are available at any point in the environment.

In one or more embodiments, the beacon spread requirement ensures that the beacons are spread sufficiently apart from each other and the beacon coverage requirement is simultaneously maintained.

In one or more embodiments, determining an optimal placement of the beacons comprises iteratively solving a best global position for all the beacons in the plurality of beacons.

In one or more embodiments, the optimal placement of the beacons is determined using a cost function, which combines a beacon coverage requirement and a beacon spread requirement to determine the optimal placement of the beacons.

In one or more embodiments, the method further comprises terminating the iterations based on a predetermined criterion.

In one or more embodiments, the predetermined criterion is a number of completed iterations.

In accordance with another aspect of the inventive concepts described herein, there is provided a non-transitory computer-readable medium embodying a set of computer-executable instructions, which, when executed in connection with a system comprising a central processing unit, a localization signal receiver and a memory, cause the system to perform a method comprising: determining an optimal number of beacons in a plurality of beacons to be placed in an environment to achieve an optional localization; and determining an optimal placement of the beacons from the plurality of beacons in the environment to achieve the optional localization.

In accordance with yet another aspect of the inventive concepts described herein, there is provided a computerized system comprising a central processing unit, a localization signal receiver and a memory, the memory storing a set of computer-readable instructions causing the system to perform a method comprising: determining an optimal number of beacons in a plurality of beacons to be placed in an environment to achieve an optional localization; and determining an optimal placement of the beacons from the plurality of beacons in the environment to achieve the optional localization.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a novel solution to generate an optimal spatial placement map for RF beacons, such as Bluetooth Low Energy (BLE) beacons, which can be used for indoor localization. A described embodiment solves for both generating optimal number of beacons required in a given environment and optimizing their location. The solution also incorporates behavior of the RF signal due to various environmental factors such as signal reflection and absorption due to static and dynamic obstacles. In one embodiment, the framework is built upon Genetic Algorithm (GA) for optimization of beacon placement. The experimental results achieved using one implementation of the described method reduced the number of beacons by 50% as compared to beacons placed using expert knowledge. Furthermore, the overall localization error increased by ~0.4 m when the results using the RF/BLE map generated by the described system were compared with the RF/BLE map generated using expert knowledge.

It should be noted that unlike traditional Radio Frequency (RF) based beacon placement techniques described in R. Faragher and R. Harle, "Location Fingerprinting With Bluetooth Low Energy Beacons," *IEEE J. Sel. Areas Commun.*, vol. 33, no. 11, pp. 2418-2428, November 2015, the described technique accounts for changes in RF signal due to various environmental factors such as multi-pathing, signal reflection etc., thereby creating a sensor model that accounts for environmental condition. Further, the described novel cost function simultaneously optimizes for both beacon coverage and spread.

Figure 1:
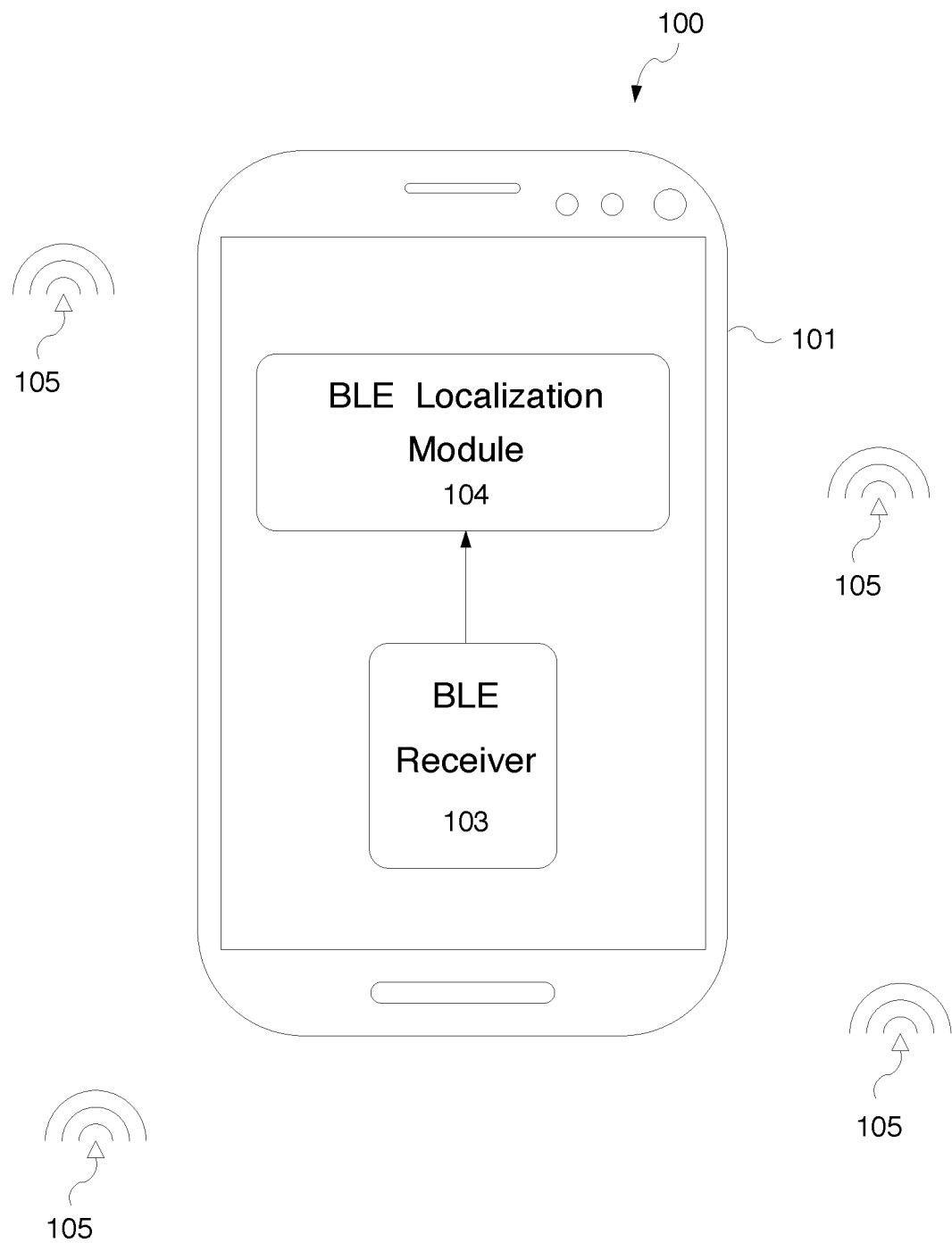
FIG. 1 illustrates an exemplary embodiment of a system for optimizing placement and number of RF/BLE beacons to achieve better indoor localization.

FIG. 1 illustrates an exemplary embodiment of a system 100 for indoor localization using beacons. In one embodiment, the system 100 is implemented based on a mobile device 101 such as a smartphone. The system 100 uses data 102 generated by the RF/BLE receiver 103, which are furnished to a RF/BLE beacon localization module 104 executed by the processor of the mobile device 101. The signal 102 of the RF/BLE receiver 103 corresponds to multiple RF/BLE beacons 105 disposed in the surroundings, such as in different rooms of a building. The RF/BLE scans consist of radio frequency (RF) signals emitted by different RF/BLE beacons 105 present in the environment. The signal is effected heavily by different environment factors and hence makes the localization problem challenging. An embodiment of the described system achieves the optimized placement and determines the optimal number of RF/BLE beacons to achieve better indoor localization using the system 100.

Figure 2:
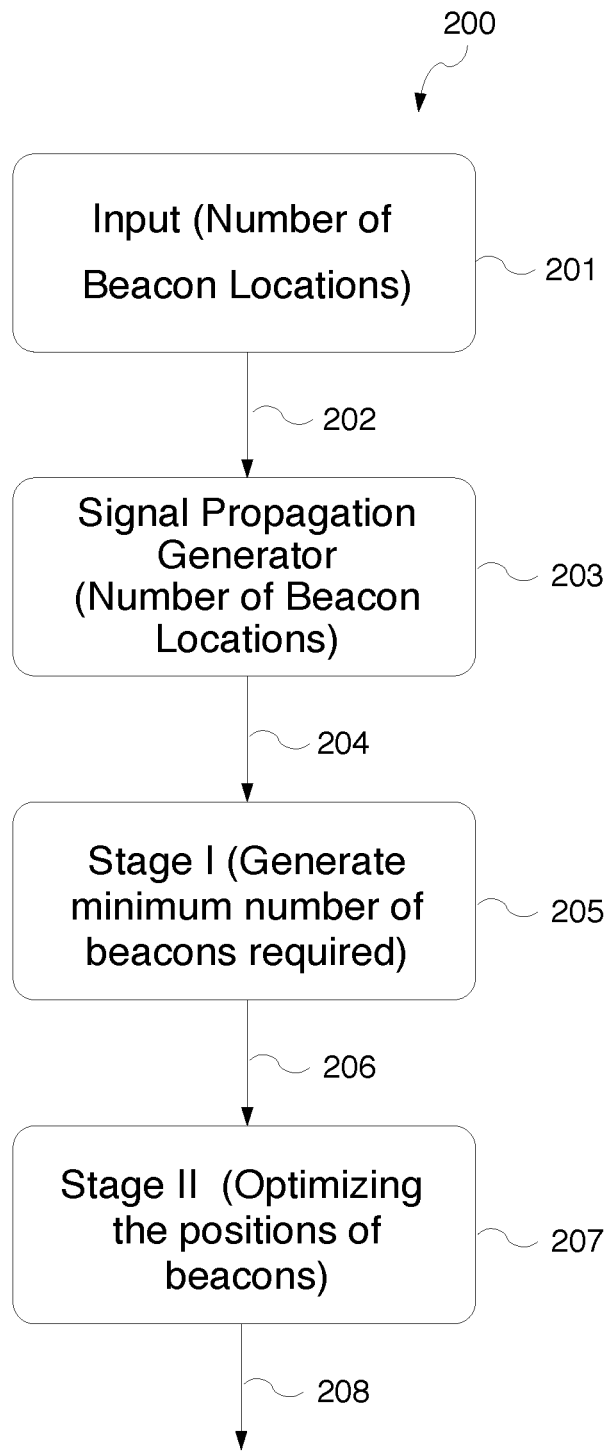
FIG. 2 illustrates an exemplary embodiment of a beacon optimization module of the system for optimizing placement and number of RF/BLE beacons to achieve better indoor localization.

In one embodiment, the system for optimizing placement and number of RF/BLE beacons to achieve better indoor localization consists of four main blocks 201, 203, 205 and 207. The exemplary system flow and interaction between each block of the system for optimizing placement and number of RF/BLE beacons to achieve better indoor localization is shown in FIG. 2. The blocks shown in FIG. 2 will be described in detail below.

Block 201—Input (Number of Beacon Locations)

The block 201 represents the input to the system, which corresponds to the list of all the possible beacon locations. In one or more embodiments, the possible beacon locations are generated by overlaying a grid of 1×1 meter on the environment. The resolution of the grid can be set to any size.

In one or more embodiments, the output 202 from this block 201:

$$B=[[x^1,y^1],[x^2,y^2],\ldots,[x^n,y^n]]$$

wherein $x^i$, $y^i$ are x and y coordinates of i-th beacon.

Block 203—Signal Propagation Generator (Number of Beacon Locations)

As it is well known in the art, radio-frequency (RF) signal behavior varies based on different locations in the environment. This signal behavior is required to evaluate the coverage of RF signal in the environment from every beacon location. Thus, a sensor model is required for estimating the signal propagation from different locations in the given environment. Modeling RF sensor is challenging as RF/BLE data is affected by various environmental factors such as multipath, reflection and line of sight. Hence in order to incorporate signals behavior due to these factors while optimizing the beacon placement, the described methodology uses PyLayer simulator described in detail in N. Amiot, M. Laaraiedh, and B. Uguen, "PyLayers: An Open Source Dynamic Simulator for Indoor Propagation and Localization," Commun. Workshop ICC, 2013, which calculates the signal loss at every location of the environment. In one embodiment, the environment information (for e.g. concrete walls, partition, obstacles) is used within the PyLayer simulator in order to get realistic signals values.

In one embodiment, the output 204 from this block 203:

$B=[[x^1,y^1,<\text{Signal propogation heatmap}>],$
$[x^2,y^2,<\text{Signal propogation heatmap}>], \ldots,$
$[x^n,y^n,<\text{Signal propogation heatmap}>]]$ Block 205—Stage I (Generate Minimum Number of Beacons Required)

In this stage, the embodiment of the system generates the count for minimum number of beacons required to cover a given environment. In one embodiment, the algorithm starts with an empty set of beacons and iteratively adds one beacon at a time till it meets a predefined termination criterion. One embodiment utilizes a novel cost function, which combines both the beacon coverage and beacon spread to generate optimal number of beacons. In one embodiment the coverage parameter is set to three so that RF/BLE scans from at least three beacons are available at any point in the environment, which in turn the minimal requirement for most localization algorithms. In one embodiment, the beacon spread parameter ensures that the beacons are spread sufficiently apart from each other and at the same time maintain the three-coverage requirement. The equation of the cost function is defined as follows, $$f = \underbrace{\frac{1}{3XY}\sum_{x=1}^{X}\sum_{y=1}^{Y}\min(c(x,y),3)}_{\text{maximizes 3-coverage}} + \lambda \underbrace{\sum_{i=1}^{N}\min_{b_j \in \{B/b_i\}}\|b_i - b_j\|}_{\text{maximizes beacons spreading}}$$

where, (X, Y) is the size of the grid-map, which is predefined as a cell with resolution of 1×1 m.

c(x,y) is the coverage from different beacon location in the environment. This is a binary value, which specifies if the beacon scan exist at that grid cell. The binary value of the coverage is generated by thresholding the RF signal at −100 db. (i.e. if a RF/BLE signal at a given cell is greater then −100 db then the coverage for that beacon at that grid cell is 1)

λ is the normalization parameter which is defined as the inverse of the inter beacon distance and the number of beacons. This parameter is primarily used to give equal importance to both k-coverage and beacon spreading during optimization.

$b_i$ & $b_j$ are the position of the $i^{th}$ & $j^{th}$ beacon.

In one embodiment, the output 206 from this block 205:

$\hat{B}=\text{length}([[x^1,y^1],[x^2,y^2], \ldots, [x^n,y^n]])$ number of beacons (m) (length of $\hat{B}$)

It should be noted that the positions of cm' beacons is also obtained but they are not utilized further in the described embodiment.

The aforesaid first stage mainly focuses on the getting the optimal number of beacons required to cover the environment. The aforesaid GA optimizes the addition of new beacon on the map without moving the previously placed beacons. The algorithm continued to add new beacons using the constraint set by the cost function. It should be noted that the value of 'λ' changes dynamically during the iterative process as it relies on the inverse of the distance between beacons and number of beacons in the environment. In one embodiment, the termination criterion was set to 90% coverage using the cost function.

Block 207—Stage II (Optimizing the Positions of Beacons)

In this stage an embodiment of the described system optimizes the placement of all the beacons obtained from the Stage I. In one embodiment, the algorithm utilizes the same cost function and signal propagation characteristics as used in stage I for optimizing beacon location. The algorithm iteratively solves for best global position for all the beacons.

In one embodiment, the output 208 from this block 207:

$B_{best}=[[x^1,y^1],[x^2,y^2], \ldots, [x^n,y^n]]$

Exemplary Algorithm for Optimization:

In one or more embodiments, the cost function (f), used in both the stages is optimized using a genetic algorithm, which is a popular tool to solve NP-hard problem. In one embodiment, the beacon placement problem is treated as NP-hard problem as the system is trying to pick 'n' location from cm' possible location. Genetic algorithms with different hyper parameters were used for performing optimization for number of beacons (stage I) and overall beacon placement (stage II). In one embodiment, the aforesaid GA algorithms solves for good candidates (beacon placement) using the constraining parameters set in the cost function.

Once the optimal number of beacons from stage I has been obtained, the embodiment of the system utilize the same GA technique to optimize the global placement of beacons on a given map. The algorithm iteratively solves for best global position for all the beacons. This is primarily different from stage I as the position of all the beacons are optimized during the iteration. In one embodiment, the termination criteria for this stage is set by the number of completed iterations.

Computing Platform

Figure 3:
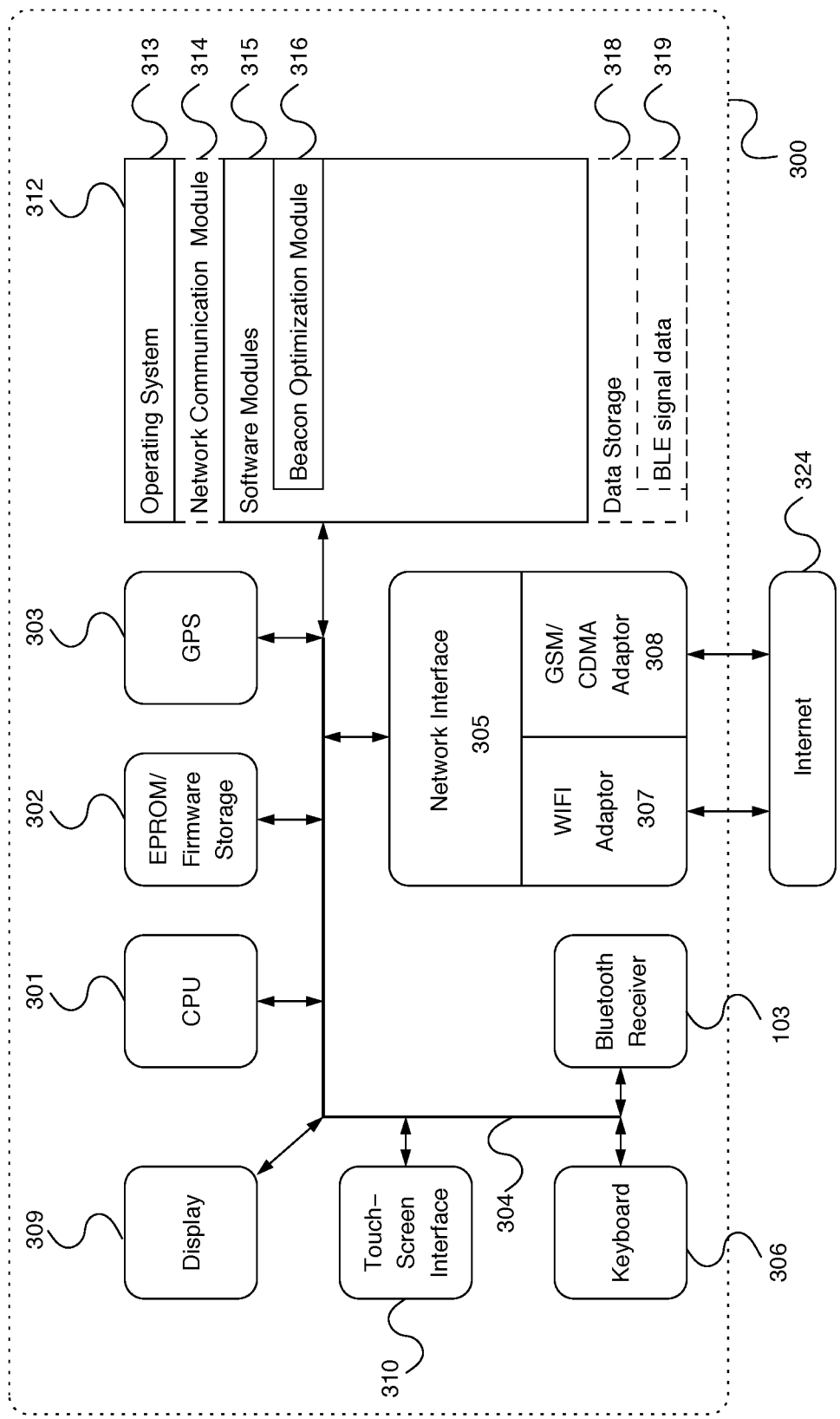
FIG. 3 illustrates an exemplary embodiment of a computerized mobile system that could be used in connection with the system illustrated in FIG. 1.

FIG. 3 illustrates an exemplary embodiment of a computerized mobile system 300 that could be used in connection with the system illustrated in FIG. 1. In one or more embodiments, the computerized mobile system 300 may be implemented within a form factor of a mobile computing device, such as a smartphone, a personal digital assistant (PDA), a tablet computer, or a smart watch, all of which are widely available commercially and are well known to persons of skill in the art.

The computerized system 300 may include a data bus 304 or other interconnect or communication mechanism for communicating information across and among various hardware components of the mobile computerized system 300, and a central processing unit (CPU or simply processor) 301 coupled with the data bus 304 for processing information and performing other computational and control tasks. Computerized system 300 also includes a memory 312, such as a random access memory (RAM) or other dynamic storage device, coupled to the data bus 304 for storing various information as well as instructions to be executed by the processor 301. The memory 312 may also include persistent storage devices, such as a magnetic disk, optical disk, solid-state flash memory device or other non-volatile solid-state storage devices.

In one or more embodiments, the memory 312 may also be used for storing temporary variables or other intermediate information during execution of instructions by the processor 301. Optionally, computerized system 300 may further include a read only memory (ROM or EPROM) 302 or other static storage device coupled to the data bus 304 for storing static information and instructions for the processor 301, such as firmware necessary for the operation of the computerized system 300, basic input-output system (BIOS), as well as various configuration parameters of the computerized system 300.

In one or more embodiments, the computerized system 300 may incorporate a display device 309, which may be also coupled to the data bus 304, for displaying various information to a user of the computerized system 300. In an alternative embodiment, the display device 309 may be associated with a graphics controller and/or graphics processor (not shown). The display device 309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 309 may be incorporated into the same general enclosure with the remaining components of the computerized system 300. In an alternative embodiment, the display device 309 may be positioned outside of such enclosure.

In one or more embodiments, the computerized system 300 may further incorporate a GPS receiver 303 connected to the data bus 304 and configured to receive location information from one or more GPS satellites and transmit this information to the processor 301 via the data bus 304.

In one or more embodiments, the computerized system 300 may incorporate one or more input devices, such as a touchscreen interface 310 for receiving tactile commands and a keyboard 306, which all may be coupled to the aforesaid data bus 304 for communicating information, including, without limitation, user command selections to the processor 301. In an alternative embodiment, input devices may include a system for tracking eye movements of the user (not shown), which may be used to indicate to the computerized system 300 the command selection by the user.

In one or more embodiments, the computerized system 300 may additionally include a location signal receiver 103, such as a Bluetooth receiver, configured to perform scan for beacons 105 and supply scan data described above to the processor 301 via the data bus 304.

In one or more embodiments, the computerized system 300 may additionally include a communication interface, such as a network interface 305 coupled to the data bus 304. The network interface 305 may be configured to establish a connection between the computerized system 300 and the Internet 324 using at least one of WIFI interface 307 and the cellular network (GSM or CDMA) adaptor 308. The network interface 305 may be configured to provide a two-way data communication between the computerized system 300 and the Internet 324. The WIFI interface 307 may operate in compliance with 802.11a, 802.11b, 802.11g and/or 802.11n protocols as well as Bluetooth protocol well known to persons of ordinary skill in the art. In an exemplary implementation, the WIFI interface 307 and the cellular network (GSM or CDMA) adaptor 308 send and receive electrical or electromagnetic signals that carry digital data streams representing various types of information. For example, the aforesaid networking components may be used to establish a network data connection between the computerized system 300 and other network components.

In one or more embodiments, the Internet 324 typically provides data communication through one or more subnetworks to other network resources. Thus, the computerized system 300 is capable of accessing a variety of network resources located anywhere on the Internet 324, such as web servers, other content servers as well as other network data storage resources. In one or more embodiments, the computerized system 300 is configured send and receive messages, media and other data, including application program code, through a variety of network(s) including Internet 324 by means of the network interface 305. In the Internet example, when the computerized system 300 acts as a network client, it may request code or data for an application program executing on the computerized system 300. Similarly, it may send various data or computer code to other network resources.

In one or more embodiments, the functionality described herein is implemented by computerized system 300 in response to processor 301 executing one or more sequences of one or more instructions contained in the memory 312. Such instructions may be read into the memory 312 from another computer-readable medium. Execution of the sequences of instructions contained in the memory 312 causes the processor 301 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 301 for execution. For example, the instructions may initially be carried on a magnetic disk from a remote computer. Alternatively, a remote computer can load the instructions into its dynamic memory and send the instructions over the Internet 324. Specifically, the computer instructions may be downloaded into the memory 312 of the computerized system 300 from the foresaid remote computer via the Internet 324 using a variety of network data communication protocols well known in the art.

In one or more embodiments, the memory 312 of the computerized system 300 may store any of the following software programs, applications or modules:

1. Operating system (OS) 313, which may be a mobile operating system for implementing basic system services and managing various hardware components of the computerized system 300. Exemplary embodiments of the operating system 313 are well known to persons of skill in the art, and may include any now known or later developed mobile operating systems.

2. Network communication module 314 for enabling network communications using one or more network interfaces described below.

3. Software modules 315 may include, for example, a set of software applications executed by the processor 301 of the computerized system 300, which cause the computerized mobile system 300 to perform certain predetermined functions, such as receive the beacon signals as described above. In one or more embodiments, the software modules 315 may include, for example, the beacon optimization module shown in FIG. 2 (element 316 in FIG. 3).

4. Data storage 318 may be used, for example, for storing the bacon scan signal data 319.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in systems and methods for optimizing placement and number of RF/BLE beacons to achieve better indoor localization. It is intended that the specification and examples be considered as exemplary only, with a true scope and spirit of the invention being indicated by the following claims.

What is claimed is:

1. A computer-implemented method, the method being performed in a computerized system comprising a central processing unit, a localization signal receiver and a memory, the computer-implemented method comprising:
   a. using the central processing unit for determining an optimal number of beacons in a plurality of beacons to be placed in an environment to achieve an optimal localization, wherein the optimal number of beacons is determined based on a first cost function, which combines a beacon coverage requirement and a beacon spread requirement to determine the optimal number of beacons, wherein determining an optimal number of beacons comprises starting with a number of beacons and iteratively adding one beacon; and
   b. using the central processing unit for determining an optimal placement of the beacons from the plurality of beacons in the environment to achieve the optimal localization, wherein the optimal placement of the beacons is determining by iteratively solving a best global position for the beacons using a second cost function, which combines the beacon coverage requirement and the beacon spread requirement to determine the optimal placement of the beacons.

2. The computer-implemented method of claim 1, wherein the beacons are Radio Frequency (RF) beacons.

3. The computer-implemented method of claim 1, wherein the beacons are Bluetooth Low Energy (BLE) beacons.

4. The computer-implemented method of claim 1, wherein the localization signal receiver is a radiofrequency receiver and wherein the localization signal sources are radiofrequency sources.

5. The computer-implemented method of claim 1, wherein determining an optimal number of beacons comprises starting with an empty set of beacons and iteratively adding one beacon at a time until a predefined termination criterion has been met.

6. The computer-implemented method of claim 1, wherein the beacon coverage requirement is set to three such that scans from at least three beacons of the plurality of beacons are available at any point in the environment.

7. The computer-implemented method of claim 1, wherein the beacon spread requirement ensures that the beacons are spread sufficiently apart from each other and the beacon coverage requirement is simultaneously maintained.

8. The computer-implemented method of claim 1, further comprising terminating the iterations based on a predetermined criterion.

9. The computer-implemented method of claim 8, wherein the predetermined criterion is a number of completed iterations.

10. The computer-implemented method of claim 1, wherein the beacon spread requirement ensures that the beacons are spread as far apart from each other and simultaneously maintain the beacon coverage requirement of at least three beacons.

11. The computer-implemented method of claim 10, wherein the cost function is further based on:
    a cell within the environment,
    an indication of coverage at the cell from different beacon locations in the environment based on a determination that a scan exists at the cell from each beacon, and
    a normalization parameter that is an inverse of inter beacon distance the number of beacons.

12. The computer-implemented method of claim 11, wherein the indication of coverage is a binary value generated by thresholding RF signals from each beacon at a predetermined value.

13. A non-transitory computer-readable medium embodying a set of computer-executable instructions, which, when executed in connection with a system comprising a central processing unit, a localization signal receiver and a memory, cause the system to perform a method comprising:
    a. using the central processing unit for determining an optimal number of beacons in a plurality of beacons to be placed in an environment to achieve an optimal localization, wherein the optimal number of beacons is determined based on a first cost function, which combines a beacon coverage requirement and a beacon spread requirement to determine the optimal number of beacons, wherein determining an optimal number of beacons comprises starting with a number of beacons and iteratively adding one beacon; and
    b. using the central processing unit for determining an optimal placement of the beacons from the plurality of beacons in the environment to achieve the optimal localization, wherein the optimal placement of the beacons is determine by iteratively solving a best global position for the beacons using a second cost function, which combines the beacon coverage requirement and the beacon spread requirement to determine the optimal placement of the beacons.

14. A computerized system comprising a central processing unit, a localization signal receiver and a memory, the memory storing a set of computer-readable instructions causing the system to perform a method comprising:
    a. using the central processing unit for determining an optimal number of beacons in a plurality of beacons to be placed in an environment to achieve an optimal localization, wherein the optimal number of beacons is determined based on a second cost function, which combines a beacon coverage requirement and a beacon spread requirement to determine the optimal number of beacons, wherein determining an optimal number of beacons comprises starting with a number of beacons and iteratively adding one beacon; and b. using the central processing unit for determining an optimal placement of the beacons from the plurality of beacons in the environment to achieve the optimal localization, wherein the optimal placement of the beacons is determine by iteratively solving a best global position for the beacons using a second cost function, which combines the beacon coverage requirement and the beacon spread requirement to determine the optimal placement of the beacons.

15. The computerized system of claim 14, wherein the localization signal receiver is a radiofrequency receiver and wherein the localization signal sources are radiofrequency sources.

16. The computerized system of claim 14, wherein determining an optimal number of beacons comprises starting with an empty set of beacons and iteratively adding one beacon at a time until a predefined termination criterion has been met.

17. The computerized system of claim 14, wherein the beacon coverage requirement is set to three such that scans from at least three beacons of the plurality of beacons are available at any point in the environment.

18. The computerized system of claim 14, wherein the beacon spread requirement ensures that the beacons are spread sufficiently apart from each other and the beacon coverage requirement is simultaneously maintained.

* * * * *